(12) United States Patent
Nogami et al.

(10) Patent No.: US 8,717,227 B2
(45) Date of Patent: May 6, 2014

(54) COMMUNICATION PROCESSING APPARATUS AND DISTANCE MEASURING METHOD FOR COMMUNICATION PROCESSING APPARATUS

(75) Inventors: Hidekatsu Nogami, Kusatsu (JP); Hirokazu Kasai, Kyoto (JP); Shuichi Matsui, Kusatsu (JP)

(73) Assignee: Omron Corporation, Kyoto (JP)

( * ) Notice: Subject to any disclaimer, the term of this patent is extended or adjusted under 35 U.S.C. 154(b) by 346 days.

(21) Appl. No.: 13/297,726

(22) Filed: Nov. 16, 2011

(65) Prior Publication Data
US 2012/0223854 A1 Sep. 6, 2012

(30) Foreign Application Priority Data
Mar. 4, 2011 (JP) .................... 2011-047497

(51) Int. Cl.
*G01S 13/00* (2006.01)
(52) U.S. Cl.
USPC ................... 342/82; 342/42; 342/118
(58) Field of Classification Search
USPC ...................... 342/20, 42–51, 127
See application file for complete search history.

(56) References Cited

U.S. PATENT DOCUMENTS

| | | | |
|---|---|---|---|
| 7,649,491 B2 | 1/2010 | Ohara et al. | |
| 7,903,022 B2 | 3/2011 | Ohara et al. | |
| 2008/0150699 A1 | 6/2008 | Ohara et al. | |
| 2008/0198903 A1* | 8/2008 | Kawai | 375/135 |
| 2010/0076722 A1 | 3/2010 | Ohara et al. | |
| 2010/0182133 A1 | 7/2010 | Ando | |

FOREIGN PATENT DOCUMENTS

| | | |
|---|---|---|
| CN | 101689247 A | 3/2010 |
| JP | 2007-74323 | 3/2007 |
| JP | 2008-232907 | 10/2008 |
| JP | 4265686 | 5/2009 |
| JP | 4462149 | 5/2010 |
| WO | 02/088776 | 11/2002 |

OTHER PUBLICATIONS

Extended European search report from counterpart European Application 11188980, dated Jun. 4, 2012.
U.S. Appl. No. 13/358,855 to Hidekatsu Nogami et al., filed Jan. 26, 2012.
Machine Translation of JP 4265686, May 20, 2009.
Machine Translation of JP 2008-232907, Oct. 2, 2008.
Machine Translation of JP 4462149, May 12, 2010.
English language Summary of Chinese Office Action in Chinese Application No. 201110369576.1, dated Dec. 23, 2013.

* cited by examiner

*Primary Examiner* — Timothy A Brainard
(74) *Attorney, Agent, or Firm* — Greenblum & Bernstein, P.L.C.

(57) ABSTRACT

A communication processing apparatus alternately transmits a carrier wave carrying a command and receives a response from a tag while transmitting an unmodulated carrier wave. A transmission control unit changes the phase of the unmodulated carrier wave transmitted from a transmission/reception circuit in response to start of reception of the reflected wave from the tag. The transmission/reception circuit includes a circuit for separating and detecting an I signal and a Q signal included in the reflected wave from the tag. A phase detection unit uses the I signal and the Q signal to detect change of the phase of the reflected wave. A distance calculation unit measures a time from a change of the phase of the unmodulated carrier wave to a detection of a corresponding change in the phase of the reflected wave, and uses the time to calculate the distance from the antenna to the tag.

5 Claims, 4 Drawing Sheets

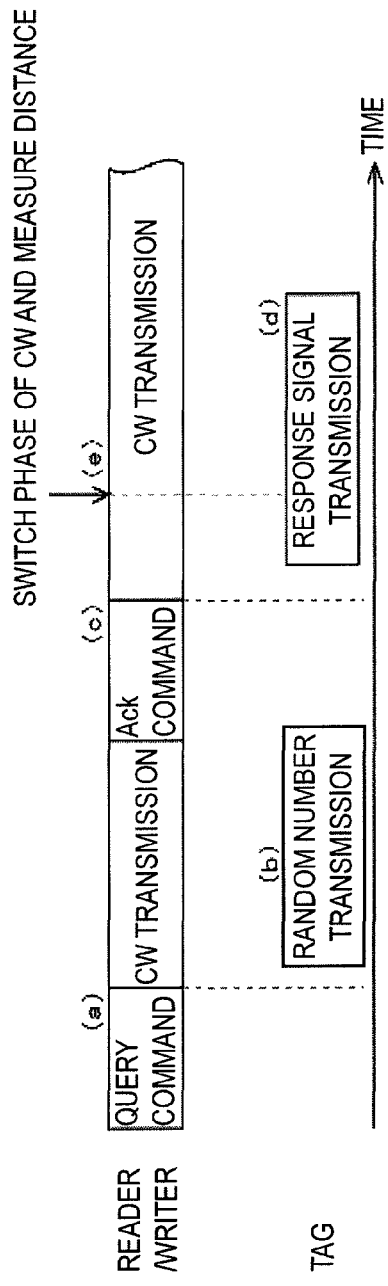
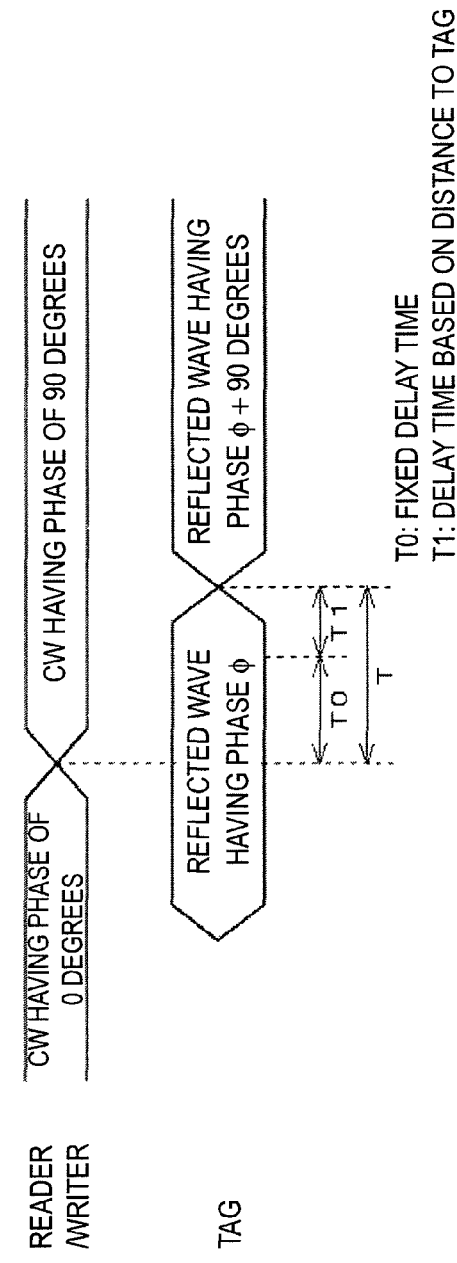

COMMUNICATION PROCESSING APPARATUS AND DISTANCE MEASURING METHOD FOR COMMUNICATION PROCESSING APPARATUS

TECHNICAL FIELD

The present disclosure relates to a communication processing apparatus for communicating with an RFID tag using a continuous carrier wave, and more particularly relates to a technique for measuring a distance between a communication processing apparatus and an RFID tag (hereinafter, may be simply referred to as "tag") and transmitting a response in reply to a command given by the communication processing apparatus.

RELATED ART

In a communication processing apparatus of an RFID method, the communication processing apparatus alternately performs processing for transmitting a command to a tag by modulating a carrier wave while continuously transmitting the carrier wave at a constant frequency and processing for receiving a response from the tag by transmitting an unmodulated carrier wave (Continuous Wave; abbreviated as CW). The tag having received the command responds to the command by changing the impedance of the circuit of the tag. As a result of response operation of this tag, a signal (reflected wave) carrying the response signal in reply to the command onto the unmodulated carrier wave is transmitted back to the communication processing apparatus, and then the response signal is decoded.

In RFID systems used in sites such as production sites and logistics sites, it is necessary to communicate with a tag within the range of the communication distance defined in advance, but depending on the wavelength of the used radio wave, the radio wave may reach a location beyond the necessary distance. The radio wave may be reflected by floors and walls at the site, and may be guided to a tag far away. As a result, the tag residing at the location not requiring communication may respond to the command, and may cause a problem in information processing. A specific example is shown in FIG. 5.

In the example of FIG. 5, antennas A1, A2 of communication processing apparatuses are provided at a side of parallel paths B1, B2, respectively, and information is read out from a tag T attached to a vehicle C traveling along the paths B1, B2 using these antennas A1, A2. In the example shown in the figure, only the antenna A1 corresponding to the path B1 in which the vehicle C is located should be allowed to communicate with the tag T, but the radio waves transmitted from the antenna A2 in the adjacent path B2 also reach the tag T. As a result, the tag T responds to the command transmitted from the antenna A2, and incorrect information may be read and written.

As methods for solving the above issues, there may be considered a method for estimating a distance from an antenna to a tag based on a strength of a response signal from the tag and a method for measuring a distance to a tag using a time length from when a command is transmitted to when a response from the tag is received (e.g., see Japanese Patent No. 4462149 and Japanese Unexamined Patent Publication No. 2008-232907).

There is also suggested a method for transmitting two kinds of carrier waves having different frequencies in order, detecting variation of a phase of a reflected wave transmitted from a tag for each frequency, and calculating a distance from the tag by performing calculation using a difference between the variations (see Japanese Patent No. 4265686).

In the method for estimating a distance to a tag based on a strength of a response wave is useful when the strength of reflection of the tag is constant and the radio wave is less likely to be reflected by the floors and walls. In reality, however, the strength of reflection of the tag varies according to difference in the attachment state of the tag and the directional pattern. Unless special equipment such as an electromagnetic wave absorber is provided, it is difficult to prevent reflection of the radio waves on the floors and the walls.

In the method for measuring a distance to a tag using a time length from when a command is transmitted to when a response from the tag is received, measuring accuracy cannot be ensured unless the response time at the tag in reply to the command (time from when the command arrives to when the response starts) is constant. In a tag of passive-type and semi-passive-type, the response time is not constant. Therefore, it is difficult to employ the above method.

The method described in Japanese Patent No. 4265686 makes use of a principle of a phase difference occurring between the carrier wave transmitted to the tag and the reflected wave transmitted from the tag in accordance with the distance to the tag and the frequency of the carrier wave. In order to ensure the measuring accuracy with this method, it is necessary to increase the difference of frequencies of the two kinds of carrier waves as much as possible, but due to the limitation of the radio wave method, it is impossible to greatly change the frequencies. When not only a reflected wave directly returning back from the tag to the antenna (direct wave) but also reflected waves returning back from the tag to the antenna by way of reflection on the floors and the walls are received by the antenna, and a phase of a composite wave of these reflected waves is detected, the variation of the phase of the reflected waves does not correctly represent the distance to the tag. Therefore, it is difficult to put this method into practical use. Even if this method is put into practice, a plurality of times of communication processings are required, which makes it difficult to apply the method to a moving tag.

SUMMARY

In view of the above issues, an object of the present disclosure is to accurately measure the distance to the tag without deteriorating the efficiency of communication processing.

In accordance with one aspect of the present disclosure, there is provided a communication processing apparatus which executes (performs) command transmission processing for transmitting a command to an RFID tag by modulating a carrier wave, reception processing for receiving a reflected wave from the RFID tag in reply (response) to an unmodulated carrier wave (CW) while transmitting the unmodulated carrier wave, and decoding processing for decoding a response signal given by the RFID tag from the received reflected wave, the apparatus including a phase detection unit (phase detector) for detecting a phase of the reflected wave received in the reception processing, a phase change unit (phase changer) for changing a phase of the unmodulated carrier wave in response to a start of reception of the reflected wave in the reception processing, and a distance measuring unit (distance measurer) for measuring a time from when the phase of the unmodulated carrier wave is changed (switched) to when change occurs in the phase of the reflected wave detected by the phase detection unit according to the change of the phase in the unmodulated carrier wave, and using the measured time and a propagation speed of the unmodulated carrier wave to measure a distance to the RFID tag that returned the reflected wave.

According to the above configuration, the phase of the unmodulated carrier wave is changed when the communication processing apparatus receives the reflected wave from the tag in a period in which the unmodulated carrier wave is transmitted in order to receive a response from the tag after the command is received. Then, a time is measured from when the phase is changed to when the same change of the phase is detected in the reflected wave received from the tag. The time taken for the radio wave to go from the communication processing apparatus to the tag and from the tag to the communication processing apparatus can be calculated from the measured time. Therefore, the distance to the tag can be measured accurately.

In an embodiment of the above communication processing apparatus, the phase change unit changes the phase of the unmodulated carrier wave in response to detection of a preamble in the response information in the decoding processing. The preamble in the response signal is configured to have bit signals of "1" and "0" arranged in a certain pattern. Therefore, by detecting the pattern, start of reception of the reflected wave can be easily determined, and the phase can be switched. In addition, noise reflected wave reflected by floors and walls and returning back to the communication processing apparatus is prevented from being falsely recognized as a reflected wave from the tag.

In another embodiment, the phase change unit changes the phase of the unmodulated carrier wave in response to detection of a preamble in the response signal in the decoding processing, and the phase detection unit detects change of the phase of the reflected wave transmitted in reply to the unmodulated carrier wave while the preamble is detected. According to this embodiment, the measuring processing of the distance can be finished while receiving the reflected wave including signals arranged in a certain pattern. Therefore, the distance can be reliably measured within one cycle of communication processing.

A communication processing apparatus according to another embodiment further includes a determining unit (determiner) for determining whether or not the RFID tag that returned the reflected wave is appropriate as a target of communication based on the distance measured by the distance measuring unit. In this manner, it is easy to employ only the response signals transmitted from the tags within the range of the defined distance, and this prevents false information processing from being carried out.

A preferred mode of a communication processing apparatus according to the present disclosure is an RFID reader/writer for reading and writing information to/from the RFID tag. However, the preferred mode is not limited thereto, and it may be configured as an RFID reader for only reading information.

In accordance with another aspect of the present disclosure, there is provided a method for measuring distance by a communication processing apparatus that executes command transmission processing for transmitting a command to an RFID tag by modulating a carrier wave, reception processing for receiving a reflected wave from the RFID tag in response to an unmodulated carrier wave while transmitting the unmodulated carrier wave, and decoding processing for decoding a response signal given by the RFID tag included in the received reflected wave. This method includes the steps of changing a phase of the unmodulated carrier wave in response to start of reception of the reflected wave in the reception processing, and thereafter, while detecting a phase of the reflected wave, measuring a time until change occurs in the phase of the reflected wave according to the change of the phase in the unmodulated carrier wave, and using the measured time to measure a distance to the RFID tag that returned the reflected wave.

According to the present disclosure, the phase of the unmodulated carrier wave is changed in response to start of reception of the reflected wave from the RFID tag in reply to the command, and the distance to the tag is measured using a length of a time from when the unmodulated carrier wave is changed to when the same change of the phase occurs in the reflected wave. Therefore, the distance can be measured without being affected by variations of reflection strength and response time of the tag in reply to the command. When communication to a tag at a location beyond the necessary range is enabled due to radio waves reflected by the floors and the like, the measured time increases according to the reflection during the propagation, and accordingly, the measured value of the distance becomes a large value. This enables measurement that is less likely to be affected by the reflections from the floors and the like.

BRIEF DESCRIPTION OF THE DRAWINGS

FIG. 2 is a time chart illustrating a flow of communication processing;

FIG. 3 is a timing chart illustrating a relationship between changes of phases of an unmodulated carrier wave (CW) and a reflected wave and a time T measured based thereon;

DETAILED DESCRIPTION

Figure 1:
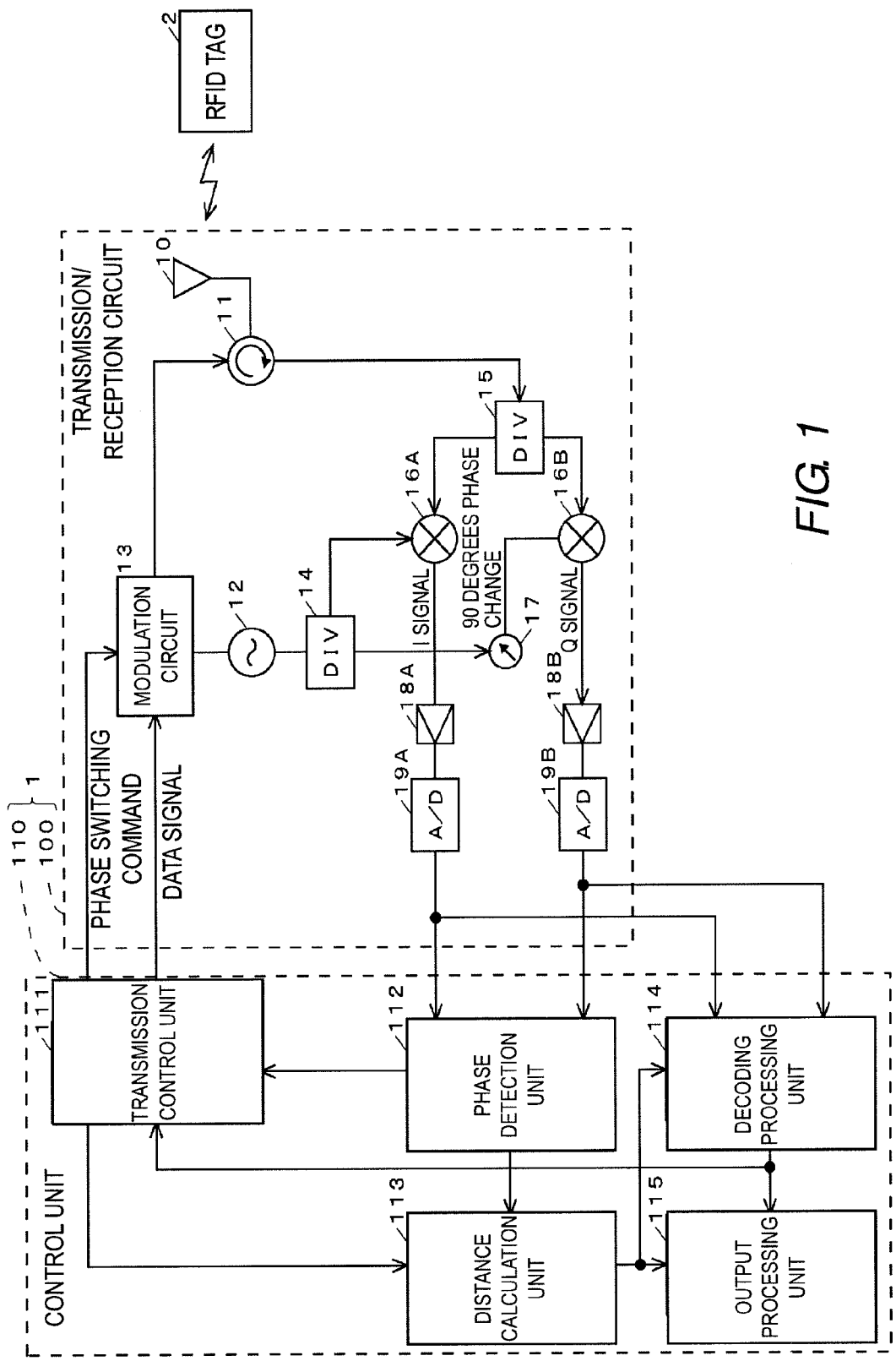
FIG. 1 is a block diagram illustrating a configuration of a reader/writer to which the present disclosure is applied.

FIG. 1 is a block diagram illustrating a configuration of a reader/writer which is an example of a communication processing apparatus to which the present disclosure is applied. A reader/writer 1 according to this embodiment communicates with a passive-type or semi-passive-type RFID tag 2 using UHF band radio wave, reads information from this tag 2, and writes information to the tag 2. The reader/writer 1 includes a transmission/reception circuit 100 including an antenna 10 and a control unit (controller) 110 for controlling operation of the transmission/reception circuit. It should be noted that the used radio wave is not limited to the UHF band. Radio waves in other bands may also be used.

The transmission/reception circuit 100 includes not only an antenna 10 but also a circulator 11, an oscillator 12, a modulation circuit 13, distributors 14, 15, mixers 16A, 16B, a 90 degrees phase shifter 17, amplifiers 18A, 18B, A/D converters 19A, 19B, and the like. The control unit 110 is actually a program logic circuit (FPGA), and is provided with functions of a transmission control unit (transmission controller) 111, a phase detection unit (phase detector) 112, a distance calculation unit (distance calculator) 113, a decoding processing unit (decoding processor) 114, and an output processing (output processor) unit 115.

Although not shown in FIG. 1, the reader/writer 1 is provided with an interface circuit for a host device (not shown). The control unit 110 carries out communication processing with a tag based on an instruction transmitted from a host device, and transmits a processing result to the host device.

The oscillator 12 outputs a frequency signal serving as a basis of a carrier wave. The modulation circuit 13 receives a data signal provided by the transmission control unit 111, and modulates a continuous carrier with the data signal. The modulated signal is guided to the antenna 10 via the circulator 11, and transmitted as an electromagnetic wave. The actual modulation occurs in a period in which a command is transmitted. In a period in which response is received from the tag 2, an unmodulated carrier wave CW (hereinafter referred to as "unmodulated wave") is transmitted.

In addition, the modulation circuit 13 includes a phase switching circuit for shifting the phase of the carrier wave. This circuit is activated in response to a phase switching command provided by the transmission control unit 111, and thereby the phase of the carrier wave is switched. In this embodiment, the modulation circuit 13 is constituted by an orthogonal modulation device, and the carrier wave phase is shifted by 90 degrees. However, the configuration of the modulation circuit 13 is not limited thereto.

The reflected wave received with the antenna 10 from the tag 2 is guided via the circulator 11 to the distributor 15, and is distributed to each of the mixers 16A, 16B. On the other hand, the distributor 14 distributes the oscillation signal provided by the oscillator 12. One of the distributed signals is directly input to the mixer 16A, and the other of the signals is input to the mixer 16B via the 90 degrees phase shifter 17. As a result, the mixer 16A outputs an I signal included in the reflected wave, and the mixer 16B outputs a Q signal included in the reflected wave. The I signal and the Q signal are respectively amplified by the amplifiers 18A, 18B, thereafter digitally converted by A/D conversion circuits 19A, 19B, and input to the control unit 110.

The I signal and the Q signal received by the control unit 110 are processed by the phase detection unit 112 and the decoding processing unit 114. The phase detection unit 112 uses the I signal and the Q signal to detect change of the phase of the reflected wave. For example, this detection processing is carried out by calculation processing for obtaining a strength ratio Q/I of the Q signal with respect to the I signal and processing for comparing each calculation result with a previous calculation result. The decoding processing unit 114 adopts the I signal and the Q signal as vectors on an IQ plane and obtains a length of a composite vector of these vectors. Then, based on time-series change of a length thereof, the decoding processing unit 114 decodes a response signal from the tag included in the reflected wave.

After the transmission control unit 111 outputs the data signal constituting the command, the transmission control unit 111 transmits a continuous wave. Further, the transmission control unit 111 outputs a phase switching command to the modulation circuit 13 in response to start of decoding of the response signal by the decoding processing unit 114. With these processings, the electromagnetic wave transmitted from the antenna 10 changes from the carrier wave carrying the command to the unmodulated wave (CW), and further changes to an unmodulated wave whose phase is shifted by 90 degrees.

The distance calculation unit 113 starts timer processing in response to output of the phase switching command, and measures the time until the phase detection unit 112 detects the same change in the phase of the reflected wave as that occurred in the unmodulated wave. Then, using the measured time, the distance from the antenna 10 to the tag 2 is calculated by executing calculation described below.

The output processing unit 115 compares the distance calculated by the distance calculation unit 113 with a reference distance transmitted from a host device in advance, and transmits, to the host device, a response signal transmitted from a tag whose distance is calculated as a distance within the reference distance. When the distance calculated by the distance calculation unit 113 is determined to be more than the reference distance, the decoding processing unit 114 determines that the communicating tag is not appropriate as a target of communication, and stops decoding processing.

Hereinafter, communication processing carried out by the reader/writer 1 will be described in detail. Especially, a method for measuring the distance from the antenna 10 to the tag 2 will be mainly described.

First, FIG. 2 illustrates, along a time axis, a flow of communication processing carried out between the reader/writer 1 and the tag 2. In this embodiment, based on EPCglobal C1 Gen 2 specification, the reader/writer 1 alternately carries out a period in which a carrier wave carrying a command is transmitted and a period in which a response from the tag 2 is received while transmitting an unmodulated wave (CW). The processing for measuring the distance to the tag 2 is also carried out during the period in which the unmodulated wave is transmitted.

Specific flow of the communication processing will be described with reference to FIG. 2. First, the reader/writer 1 transmits a detection command (query command) to all the tags 2 included in the communication range ((a) in FIG. 2). The tag 2 having received the command generates a random number, and transmits the random number to the reader/writer 1 ((b) in FIG. 2). The reader/writer 1 having received the random number recognizes the number of tags within the communication range based on the number of receptions. Subsequently, the reader/writer 1 sequentially executes, for each tag, processing for identifying a tag with which the reader/writer communicates based on the received random number and transmitting a command (Ack command) for requesting reading of information, and processing for receiving a response signal from the tag in reply to the command ((c) (d) in FIG. 2). While the response signal in reply to the Ack command is received, processing for switching the phase of the unmodulated wave and measuring processing of the distance are carried out ((e) in FIG. 2).

FIG. 3 schematically illustrates a relationship between the phase of the unmodulated wave and the phase of the reflected wave transmitted from the tag 2. Where the phase of the initially transmitted unmodulated wave (in synchronization with the frequency signal provided by the oscillator 12) is 0 degrees, the phase of the unmodulated wave is 90 degrees after the phase is switched.

The reflected wave transmitted from the tag 2 in reply to the unmodulated wave transmitted from the antenna 10 returns back to the antenna 10 after a predetermined period of time has passed since the transmission. However, at this time, the phase of the reflected wave is shifted according to the distance from the antenna 10 to the tag 2 and the frequency of the unmodulated wave. In this case, this amount of shift is denoted as $\phi$. Since the frequency of the unmodulated wave is constant, the position of the tag 2 is assumed to be almost the same. In this case, the amount of shift of the phase of the reflected wave is also $\phi$ even after the phase of the unmodulated wave is switched. Therefore, the phase difference between the reflected wave in reply to the unmodulated wave having the phase of 0 degrees and the reflected wave in reply to the unmodulated wave having the phase of 90 degrees is also almost 90 degrees.

In this embodiment, by making use of the above phenomenon, the phase of the unmodulated wave is switched from 0 degrees to 90 degrees in response to the start of reception of the reflected wave transmitted from the tag 2. The start of reception of the reflected wave can be determined when the decoding processing unit 114 detects a preamble at the head of the response signal. Therefore, in this embodiment, the phase of the unmodulated wave is switched in response to detection of several bits at the head of the preamble, and a time T is measured from when the phase is thus switched to when the phase of the reflected wave changes almost 90 degrees.

As described above, the timer processing is quickly started in response to the reflected wave reaching the reader/writer 1 which is generated by the start of response to the command by the tag 2, and the timer processing is finished when the reflected wave transmitted by the tag 2 in reply to the switching portion of the phase of the unmodulated wave reaches the reader/writer 1. Therefore, it is possible to measure the time not including any delay time that is required by the tag 2 to receive the command and respond to the command. The measured time T is considered to include a delay time T0 caused by circuit characteristics of the reader/writer 1 and a time T1 for which the radio wave moves from the antenna to the tag and from the tag to the antenna. The delay time T0 is a fixed time that can be obtained from a propagation speed of the signal and a length of the signal line between the control unit 110 and the antenna 10.

Therefore, in the control unit 110 of this embodiment, the delay time T0 obtained in advance is registered, and the distance calculation unit 113 derives a distance R from the antenna 10 to the tag 2 by executing the following arithmetic expression using the registered time T0 and the measured time T.

$$R = c \cdot (T-T0)/2 \: (c \text{ is light speed})$$

In this embodiment, the phase of the unmodulated wave is immediately switched in response to the start of decoding of the preamble at the head portion of the response signal from the signal received by the antenna 10. Therefore, in most cases, the distance R can be calculated by detecting change of the phase of the reflected wave before decoding of the preamble is finished. In the preamble, signals "1" and "0" are arranged in a particular pattern. Therefore, start of reception of the reflected wave can be reliably detected. In addition, in the processing for detecting change of the phase, the accuracy of detection can be enhanced by using the phase detected from the I signal and the Q signal obtained with timing at which "1" is decoded. However, the timing of switching the phase of the unmodulated wave is not limited to the period in which the preamble is detected. The phase may be switched while a specific content of the response signal subsequent to the preamble is detected. The phase difference between the unmodulated wave not yet switched and the switched unmodulated wave is not limited to 90 degrees. As long as change of the phase of the reflected wave transmitted from the tag 2 can be detected using the I signal and the Q signal, the phase difference may be any angle.

Figure 4:
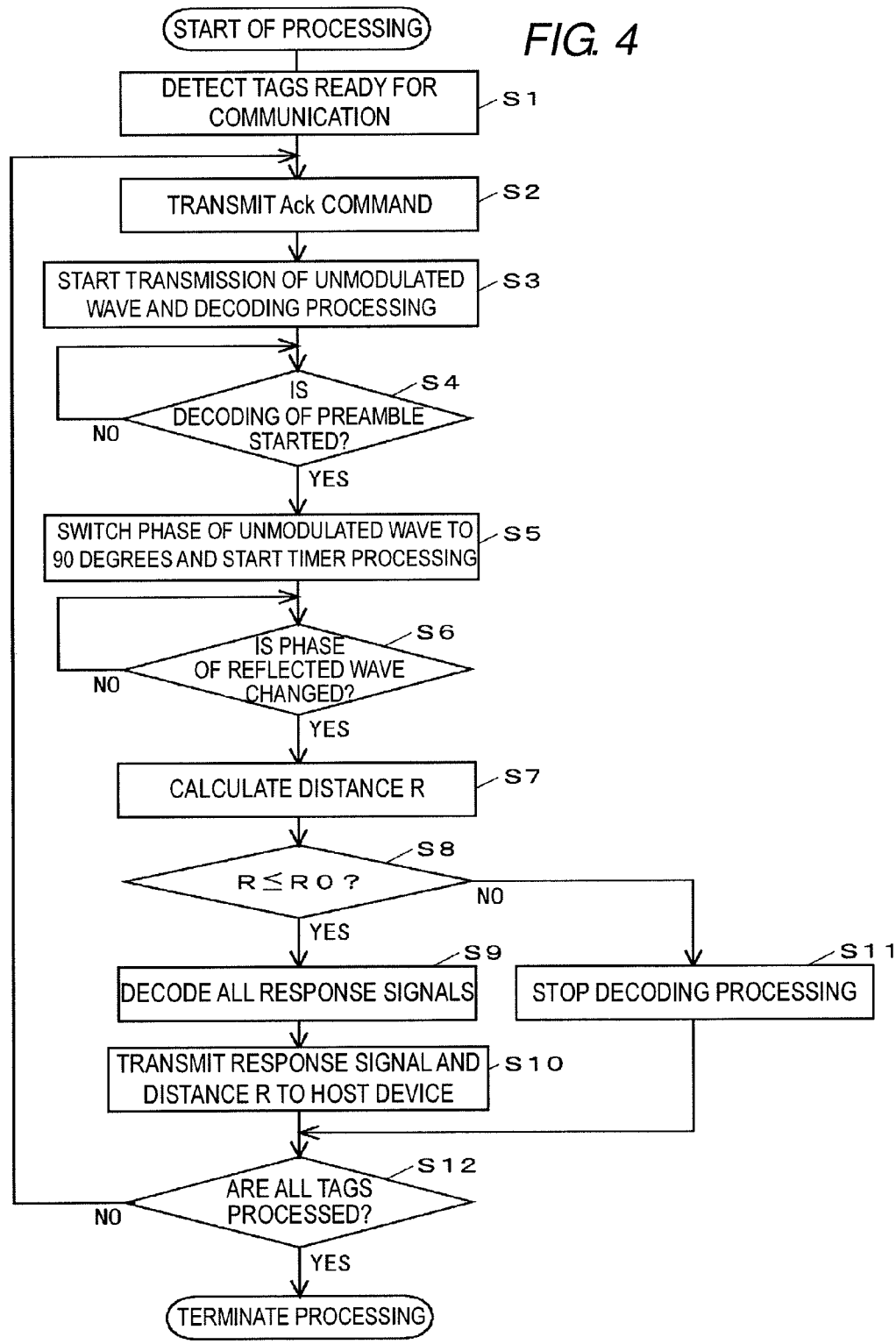
FIG. 4 is a flowchart illustrating a processing procedure in a control unit (controller) of the communication processing apparatus.
Figure 5:
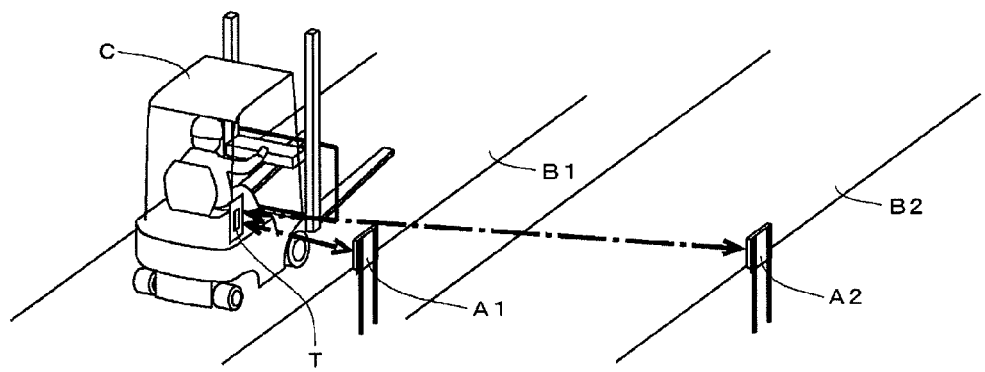
FIG. 5 is an explanatory diagram illustrating an example of incorrect communication processing.

FIG. 4 illustrates a flow of a series of processing carried out by the control unit 110 of the reader/writer 1 in order to achieve the processings as shown in FIGS. 2 and 3. First, in step S1, processing for transmitting the query command and receiving and decoding the response from the tag 2 is carried out, and tags 2 ready for communication are detected.

Thereafter, for each of the detected tags 2, processing of step S2 and subsequent steps is executed. First, in step S2, the Ack command is transmitted, and in step S3 subsequent thereto, transmission of the unmodulated wave and the decoding processing are started. Thereafter, in the decoding processing, the reader/writer 1 waits until decoding of the preamble of the response signal is started (step S4).

When decoding of the preamble is started ("YES" in step S4), the phase of the unmodulated wave is switched from 0 degrees to 90 degrees, and the timer processing is started (step S5). Thereafter, while the phase of the reflected wave is detected using the I signal and the Q signal obtained with the timing at which the signal of "1" in the preamble is decoded, the reader/writer 1 waits until the phase changes substantially 90 degrees (step S6).

When determined that the above change has occurred ("YES" in step S6), the above arithmetic expression [R=c·(T−T0)/2] is executed using the measured time T up to the time when the change has occurred, thereby calculating the distance R from the antenna 10 to the tag 2 (step S7).

Subsequently, the calculated distance R is compared with the reference distance R0. When R≤R0 holds ("YES" in step S8), the decoding processing is continuously performed, so that all the response signals are decoded (step S9). Further, the decoded response signal as well as the distance R are transmitted to the host device (step S10). On the other hand, when R>R0 holds ("NO" in step S8), the processing proceeds to step S11 and the decoding processing is terminated.

By carrying out the same processing, only the response signals from the tags whose distances R are within the reference distance R0 are decoded, and the response signals as well as the distances R are transmitted to the host device. When step S12 is determined to be "YES" upon finish of processing performed on all the tags, the processing is terminated. The switching of the phase of the unmodulated wave is cancelled after the decoding of the response signal is finished or terminated, and an Ack command for a subsequent tag is transmitted with a carrier wave having a phase of 0 degrees. Another command may be transmitted to the tags on which the processing of steps S9, S10 is executed, and responses therefrom may be received. In such a case, it is not necessary to carry out the processing for calculating the distance R again (steps S4 to S8).

As described above, the measured time T according to this embodiment does not include the delay time caused by the response time of the response transmitted by the tag 2 in reply to the command, and therefore, the distance R can be obtained by accurately calculating the time taken by the radio wave to go from antenna 10 to the tag 2 and from the tag 2 to the antenna 10. Not only the reflected wave reflected by the tag 2 and directly returning back to the antenna 10 (direct wave) but also reflected waves returning back from the tag 2 to the antenna 10 by way of reflection on the floors and the like may reach the antenna 10. However, the former may reliably reach the antenna 10 earlier than the latter. Therefore, the phase of the unmodulated wave is changed in response to the start of reception of the reflected wave transmitted from the tag 2, and the arrival of the direct wave in reply to the unmodulated wave immediately after the change of the phase can be easily detected by detecting the first change of the phase occurring in the reflected wave thereafter. Therefore, the distance R calculated according to the above embodiment is not affected by the reflected wave from the floors and the like, and the distance from the antenna 10 to the tag 2 can be accurately obtained.

Since the distance R is measured while performing the processing for decoding the response signal transmitted from the tag 2, the distance can be measured within the cycle of normal communication processing, and information about the tag 2 can be obtained. Therefore, no problem would be caused in the communication with the moving tag 2. On the other hand, the decoding process is terminated for a response signal transmitted from a tag whose distance R is beyond the reference distance R0. Therefore, the processing can be performed efficiently, thereby preventing transmission of unnecessary information to the host device. Further, since not only the decoded response signal but also the calculation result of the distance R are transmitted to the host device, the host device can distinguish the information of the tag 2 and recognize the distance between the tag 2 and the antenna 10.

However, it is not necessary for the reader/writer 1 to select the response signal from the tag 2. That is, regardless of the value of the distance R, the response signals from all the tags 2 with which the reader/writer 1 communicates may be decoded, and each response signal as well as the distance R may be transmitted to the host device. Alternatively, only the processings up to the comparison processing between the distance R and the reference distance R0 may be performed, and information about the response signal from each tag associated with data showing the comparison result of the distance may be transmitted to the host device. In this manner, the host device can easily select the response signal.

In the above embodiment, the phase of the unmodulated wave is changed by 90 degrees. However, the variation is not limited to 90 degrees, and may be set to another angle. Even in such a case, the distance R can be accurately obtained by measuring the time from when the phase of the unmodulated wave is switched to when change occurs in the reflected wave according to change of the phase in the unmodulated wave.

What is claimed is:

1. A communication processing apparatus that processes and transmits a command to an RFID tag by modulating a carrier wave, receives and processes a reflected wave from the RFID tag in response to an unmodulated carrier wave while transmitting the unmodulated carrier wave, and decodes and processes a response signal of the RFID tag from the received reflected wave, the apparatus comprising:
   a phase detector that detects a phase of the reflected wave received in the reception processing;
   a phase changer that changes a phase of the unmodulated carrier wave in response to a start of reception of the reflected wave in the reception processing; and
   a distance measurer that measures a time from when the phase of the unmodulated carrier wave is changed to a time when a corresponding change occurs in the phase of the reflected wave detected by the phase detector, and that uses the measured time to measure a distance to the RFID tag that returned the reflected wave.

2. The communication processing apparatus according to claim 1, wherein the phase changer changes the phase of the unmodulated carrier wave in response to a detection of a preamble in the response signal in the decoding processing.

3. The communication processing apparatus according to claim 1, wherein the phase changer changes the phase of the unmodulated carrier wave in response to a detection of a preamble in the response signal in the decoding processing, and
   the phase detector detects a change of the phase of the reflected wave transmitted while the preamble is being detected.

4. The communication processing apparatus according to claim 1 further comprising:
   a determiner that determines whether the RFID tag that returned the reflected wave is appropriate as a target of communication based on the distance measured by the distance measurer.

5. A method of measuring distance by a communication processing apparatus that processes and transmits a command to an RFID tag by modulating a carrier wave, receives and processes a reflected wave from the RFID tag in response to an unmodulated carrier wave while transmitting the unmodulated carrier wave, and decodes and processes a response signal of the RFID tag included in the received reflected wave, the method comprising:
   changing a phase of the unmodulated carrier wave in response to a start of reception of the reflected wave in the reception processing; and
   while detecting a phase of the reflected wave, measuring a time until a change occurs in the phase of the reflected wave that corresponds to the change of the phase in the unmodulated carrier wave, and using the measured time to measure a distance to the RFID tag that returned the reflected wave.

* * * * *